United States Patent
Steplewski et al.

(10) Patent No.: US 6,892,931 B2
(45) Date of Patent: May 17, 2005

(54) METHODS FOR REPLACING PORTIONS OF TURBINE SHROUD SUPPORTS

(75) Inventors: Marek Steplewski, Pharr, TX (US); Bhupendra K. Gupta, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 10/330,420

(22) Filed: Dec. 27, 2002

(65) Prior Publication Data

US 2004/0124229 A1 Jul. 1, 2004

(51) Int. Cl.⁷ ............................................. B23K 31/02
(52) U.S. Cl. ........................ 228/119; 228/170; 228/182; 29/402.16; 29/889
(58) Field of Search .......................... 228/13, 14, 49.1, 228/119, 170, 182; 29/402.1, 402.16, 889, 889.1, 889.2, 889.21

(56) References Cited

U.S. PATENT DOCUMENTS

| | | | |
|---|---|---|---|
| 3,628,880 A | 12/1971 | Smuland | |
| 3,907,455 A | 9/1975 | Monsarrat | |
| 4,063,847 A | 12/1977 | Simmons | |
| 4,303,371 A | 12/1981 | Eckert | |
| 4,371,311 A | 2/1983 | Walsh | |
| 4,693,667 A | 9/1987 | Lenz et al. | |
| 4,820,116 A | 4/1989 | Hovan et al. | |
| 4,844,322 A * | 7/1989 | Flowers et al. | 228/119 |
| 4,946,346 A | 8/1990 | Ito | |
| 5,188,507 A | 2/1993 | Sweeney | |
| 5,201,846 A | 4/1993 | Sweeney | |
| 5,577,884 A | 11/1996 | Mari | |
| 5,593,276 A | 1/1997 | Proctor et al. | |
| 5,593,277 A | 1/1997 | Proctor et al. | |
| 5,749,701 A | 5/1998 | Clarke et al. | |
| 5,772,400 A | 6/1998 | Pellow | |
| 5,993,150 A | 11/1999 | Liotta et al. | |
| 6,120,242 A | 9/2000 | Bonnoitt et al. | |
| 6,142,730 A | 11/2000 | Tomita et al. | |
| 6,241,471 B1 | 6/2001 | Herron | |
| 6,254,345 B1 | 7/2001 | Harris et al. | |
| 6,367,686 B1 * | 4/2002 | Abriles et al. | 228/206 |
| 6,431,820 B1 | 8/2002 | Beacock et al. | |
| 6,508,000 B2 * | 1/2003 | Burke et al. | 29/889.1 |

FOREIGN PATENT DOCUMENTS

| | | |
|---|---|---|
| EP | 1079076 | 2/2001 |
| EP | 1174209 | 1/2002 |

* cited by examiner

Primary Examiner—Kiley Stoner
Assistant Examiner—Jonathan Johnson
(74) Attorney, Agent, or Firm—William Scott Andes; Armstrong Teasdale LLP

(57) ABSTRACT

A method facilitates replacing a portion of a gas turbine engine turbine support. The turbine support includes a body including a forward leg, an aft leg, and a mounting flange that each extend radially outwardly from the body. The forward leg is axially upstream from the aft leg and the mounting flange. The mounting flange is substantially axially aligned with respect to the aft leg. The method comprises cutting through at least one of the body, the aft leg, and the mounting flange, removing the forward leg and at least a portion of the body that is upstream from the cut from the engine, and coupling a replacement spad to the portion of the turbine support that is downstream from the cut.

20 Claims, 3 Drawing Sheets

METHODS FOR REPLACING PORTIONS OF TURBINE SHROUD SUPPORTS

BACKGROUND OF THE INVENTION

This invention relates generally to gas turbine engines, and more particularly, to methods for replacing turbine shroud supports.

At least some known gas turbine engines include a core engine having, in serial flow arrangement, a fan assembly and a high pressure compressor which compress airflow entering the engine, a combustor ignites a fuel-air mixture which is then channeled through a turbine nozzle assembly towards low and high pressure turbines which each include a plurality of rotor blades that extract rotational energy from airflow exiting the combustor.

The turbine nozzle assemblies are positioned between adjacent rows of rotor blades and channel airflow downstream towards the rotor blades. More specifically, at least some known turbine nozzles include vanes that extend radially between an inner and an outer band. Each nozzle assembly is coupled to casing surrounding the rotor assembly by a plurality of hook assemblies that extend outwardly from the outer band. More specifically, at least some known nozzle assemblies are coupled to the casing through a shroud support.

During engine operation, stresses may be induced to the shroud support through from the nozzle vane assemblies. Over time, continued exposure to such stresses may cause cracking the shroud support. Continued operation with such cracking may cause premature failure of the shroud support. Accordingly, to facilitate preventing such premature failure, shroud supports are routinely inspected for cracking.

Current repair methods include welding the cracks using a gas tungsten arc welding process. However, such techniques are time consuming as each welding process requires a heat treatment before the support may be returned to service. Furthermore, although such a process may restore the part to a base condition, occasionally, such a process may actually result in excessive shrinkage of the shroud segment which over time may cause promote increased cracking, and a subsequent decrease in the useful service life of the shroud support.

BRIEF SUMMARY OF THE INVENTION

In one aspect, a method for replacing a portion of a gas turbine engine turbine support is provided. The turbine support includes a body including a forward leg, an aft leg, and a mounting flange that each extend radially outwardly from the body. The forward leg is axially upstream from the aft leg and the mounting flange. The mounting flange is substantially axially aligned with respect to the aft leg. The method comprises cutting through at least one of the body, the aft leg, and the mounting flange, removing the forward leg and at least a portion of the body that is upstream from the cut from the engine, and coupling a replacement spad to the portion of the turbine support that is downstream from the cut.

In another aspect of the invention, a method for replacing a portion of a turbine support within a gas turbine engine is provided. The turbine support is fabricated from a first material and includes a forward leg and an aft leg that extend radially inwardly from a body. The turbine support also includes a mounting flange that extends radially outwardly from the body. The method comprises cutting through the turbine support, removing the portion of the turbine support that is upstream from the cut such that the support forward leg and at least a portion of the support body are removed from the gas turbine engine, and coupling a replacement spad to the turbine support that is downstream from the cut, wherein the replacement spad is fabricated from a second material that is different than the support first material.

In a further aspect, a method for repairing a turbine support for a gas turbine engine is provided. The turbine support includes at least a forward mounting foot coupled to a body with a forward leg, and an aft mounting foot coupled to the body with an aft leg. The method comprises inspecting the turbine support for cracking, repairing cracks detected with a welding process, cutting through the turbine support such that a portion of the turbine support including at least one of the aft mounting foot and the forward mounting foot is removable from the turbine, coupling a replacement spad to the remaining portion of the turbine support, and heat treating the turbine support after the replacement spad is coupled to the turbine support.

DETAILED DESCRIPTION OF THE INVENTION

Figure 1:
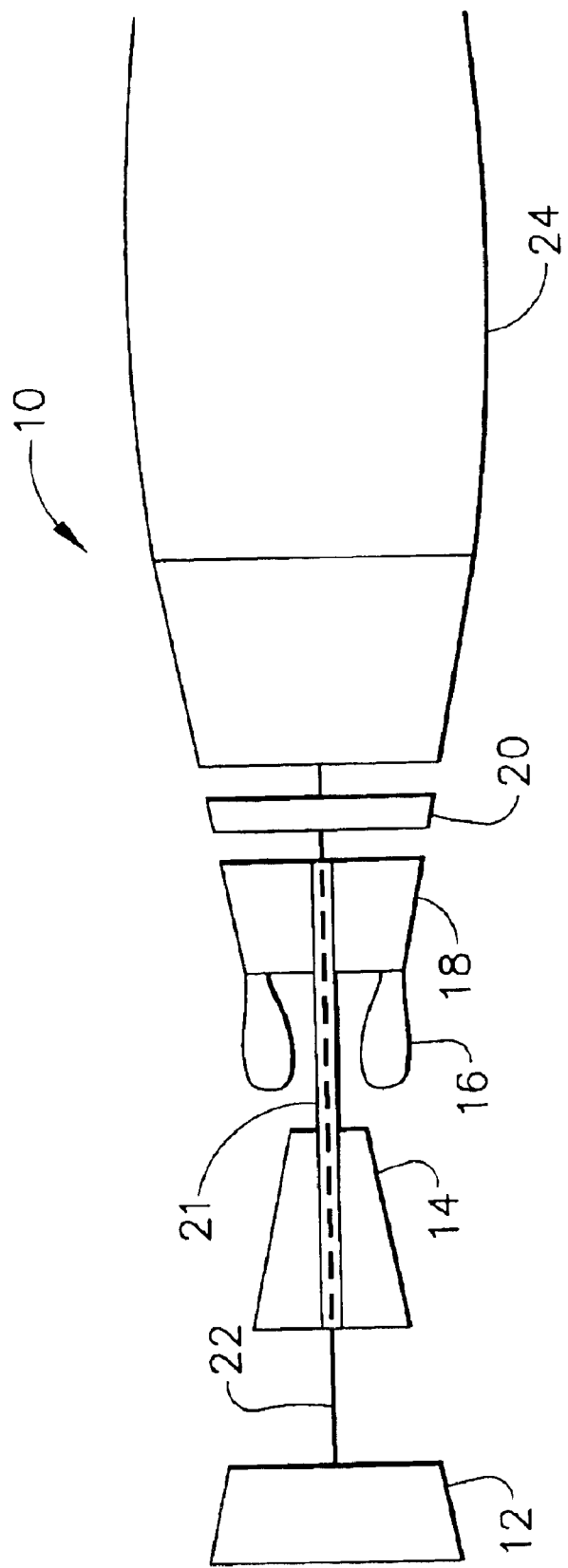
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
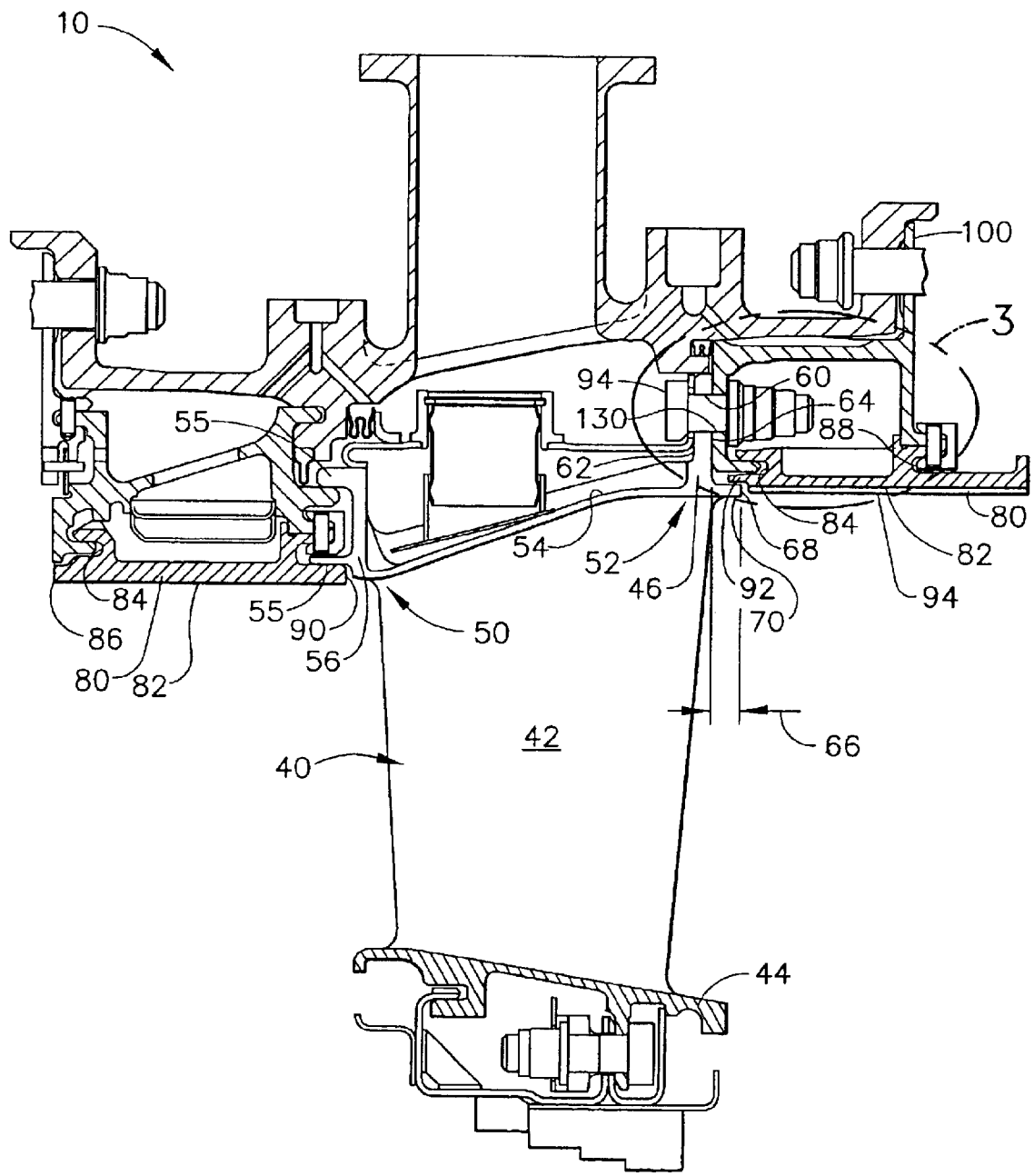
FIG. 2 is a partial cross-sectional schematic view of the engine shown in FIG. 1.
Figure 3:
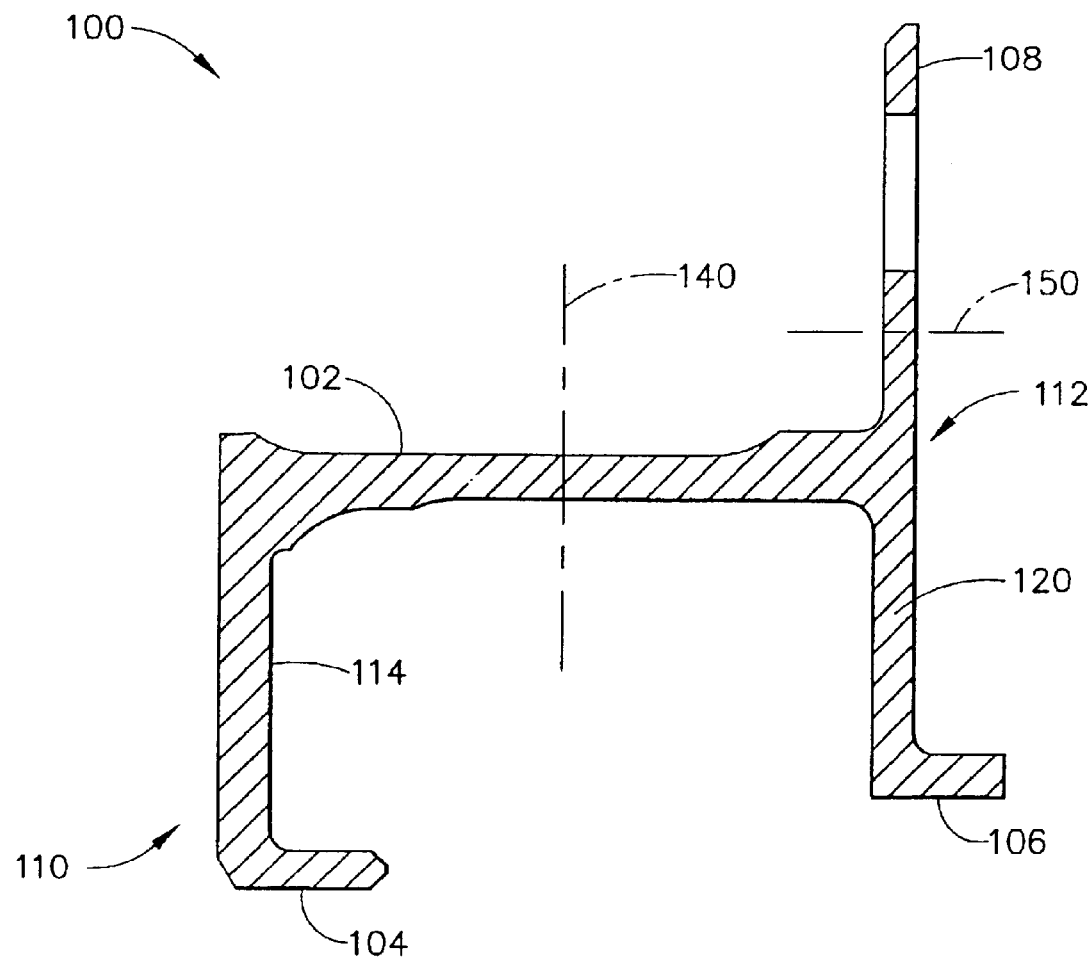
FIG. 3 is an enlarged cross-sectional schematic view of a portion of the engine shown in FIG. 2 and taken along area 3.

FIG. 2 is a partial cross-sectional view of engine 10. FIG. 3 is an enlarged cross-sectional view of a portion of engine 10 taken along area 3 (shown in FIG. 2). More specifically, FIG. 2 is a partial cross-sectional schematic view of a portion of high pressure turbine 18. Turbine 18 includes a plurality of nozzle vane segments 40 that each include a plurality of nozzle vanes 42 that extend circumferentially within engine 10 about an axis of rotation for engine 10. Each nozzle vane 42 extends generally radially between a radially inner band 44 and a radially outer band 46.

Each nozzle outer band 46 includes a forward hook assembly 50 and an aft rail assembly 52 that each extend outwardly from a radially outer surface 54 of outer band 46. More specifically, each hook assembly 50 includes at least one hook 55 that is coupled to outer band 46 through a forward rail 56, such that hook assembly 50 extends substantially perpendicularly upstream from forward rail 56. In the exemplary embodiment, aft rail 52 is substantially parallel to forward rail 56 and includes an opening 60 that extends therethrough between an upstream side 62 and a downstream side 64 of rail 52. Nozzle aft rail 52 is positioned a distance 66 upstream from a trailing edge 68 of nozzle outer band 46, such that an aft retainer portion 70 of outer band 46 is defined. Specifically, aft retainer portion 70 extends in a circumferential direction between nozzle aft rail 52 and nozzle trailing edge 68.

Each nozzle vane segment 40 is secured to a shroud 80 that extends circumferentially around turbine 18. More specifically, shroud 80 includes a plurality of shroud segments 82 that each include a forward groove 84 that extends into each segment 82 from a leading edge 86 of each shroud segment 82, and an aft groove 88 that extends upstream from a trailing edge 90 of each segment 82. Each shroud segment 82 also includes a forward recessed area 92 that extends from a radially inner surface 94 of each shroud segment 82 along segment leading edge 86 towards forward groove 84.

Nozzle vane forward hook assembly 50 is coupled to nozzle vane segment aft groove 88 such that nozzle vane segment 40 is inserted within, and supported by, shroud segment 82. Nozzle vane aft retainer portion 70 is received within shroud segment forward recessed area 92 and is retained therein by a fastener 94 that extends through aft rail opening 60. More specifically, fastener 94 extends through opening 60 and couples nozzle vane segment 40 to shroud segment 82 through a shroud support 100.

Shroud support 100 includes a body 102, a forward mounting foot 104, an aft mounting foot 106, and a mounting flange 108. Body 102 extends generally axially between an upstream side 110 and a downstream side 112. Forward mounting foot 104 is coupled to body 102 through a forward leg 114 that extends substantially perpendicularly, and radially inwardly, from body 102. More specifically, forward mounting foot 104 extends substantially perpendicularly downstream from forward leg 114. Aft mounting foot 106 is coupled to body 102 through an aft leg 120 that extends substantially perpendicularly, and radially inwardly, from body 102. More specifically, aft mounting foot 106 extends substantially perpendicularly downstream from aft leg 114. Mounting flange 108 extends substantially perpendicularly, and radially outwardly, from body 102, and is substantially axially aligned with, and oppositely disposed from, aft leg 120.

Fastener 94 extends through aft rail opening 60 through an opening 130 defined in shroud support forward leg 114. More specifically, when nozzle vane segment is coupled to shroud support 100, forward mounting foot 104 is received within shroud segment forward groove 84 such that nozzle vane segment 40 is supported by forward groove 84.

During operation, thermal stresses and mechanical loading may induce stresses into nozzle vane segment 40 that may be transmitted to shroud support 100. Over time, continued operation with such stresses may cause cracking to develop within shroud support 100. Continued operation with such cracking may cause premature failure of shroud support 100. Generally, the cracking within shroud support 100 may be more severe adjacent nozzle vane segment 38, such as within forward leg 114 and/or forward mounting foot 104.

To facilitate extending a useful life of shroud support 100, deteriorated and/or damaged areas of shroud support 100 may be removed and replaced using the methods described herein. More specifically, in one embodiment, forward leg 114, forward mounting foot 104, and a portion of body 102 may be replaced. In another embodiment, aft leg 120 and aft mounting foot 106 may also be replaced with forward leg 114, forward mounting foot 104, and body 102.

If an inspection of a field returned engine, such as engine 10, indicates that a shroud support 100 is deteriorated, and includes cracking, initially shroud support 100 is grit blasted to facilitate removing any contaminants that may be undesirably attached to shroud support 100. Cracks located at that time are then welded using a gas tungsten arc welding process (GTAW). If the inspection also indicates a forward leg 114 and/or forward mounting foot 104 is deteriorated, a circumferential cut is made through shroud support 100. Specifically, as shown in FIG. 3, the cut is made radially through shroud support body 102, as illustrated with line 140, such that a portion of support 100 remains secured within engine 10.

If however, the inspection also reveals that body 102, aft leg 120, and/or aft mounting foot 106 are deteriorated, a circumferential cut is made through mounting flange 108 rather than through body 102, such that only a portion of mounting flange 108 remains secured within engine 10. More specifically, as shown in FIG. 3, the cut in this case is made through mounting flange 108, as illustrated with line 150, such that forward leg 114, forward mounting foot 104, body 102, aft mounting foot 106, and aft leg 120 are removable from engine 10.

After deteriorated regions of shroud support 100 are removed from engine 10, a replacement spad portion (not shown) may be coupled to the portion of shroud support 100 remaining within engine 10. The replacement spad is sized substantially identical to the original dimensions of the deteriorated region of support 100 being replaced, such that shroud support 100 is returned to substantially the original predefined dimensional requirements.

The replacement spad is then welded to the portion of shroud support 100 that is aft of the cut 140 or 150. More specifically, a downstream side (not shown) of the replacement spad is welded to the existing portion of shroud support 100 that is aft of cut 140 or 150. In the exemplary embodiment, electron beam (EB) welding is used to secure the replacement spad within engine 10.

The replacement spad is fabricated from a bimetallic material that is different than the material originally used in fabricating shroud support 100. More specifically, the replacement spad material has enhanced wear and strength characteristics in comparison to the material originally used in fabricating shroud support 100. For example, in the exemplary embodiment, shroud support 100 was fabricated from either Inco 718® or Waspalloy®, and the spad is fabricated from Rene' 41®. Accordingly, the replacement spad provides enhanced strength and ductility over the material used in the original fabrication of shroud support 100.

Once welded in position, the spad and shroud supports 100 are heat treated and then may be machined if necessary, and coated with a metal coating, such as thermal barrier coating material. The material used in fabricating the replacement spad facilitates reducing repair time by reducing time-consuming re-work of cracks and associated heat treatments. Furthermore, the material is more heat resistant than the original shroud support material, and as such, shrinkage of shroud support forward mounting foot 104 is facilitated to be reduced.

Because deteriorated shroud supports 100 are replaced using the method described herein, engines 10 are returned to service using a replacement process that facilitates improved savings in comparison to removing and replacing entire shroud supports 100. Furthermore, because the replacement spads are fabricated to be substantially identical to originally installed shroud supports, redesign and sizing issues are virtually eliminated.

The above-described shroud support replacement/repair method is cost-effective and highly reliable. The method includes the steps of removing deteriorated portions from the shroud support, such that deteriorated portions of the shroud supports may be replaced. In one embodiment, deteriorated portions are removed by cutting through radially through the shroud support body such that the forward leg and forward mounting foot are removable. In another embodiment, the cut is made through the mounting flange such that the aft leg, aft mounting foot, and the shroud support body are also replaceable. As a result, a method is provided which enables deteriorated portions of shroud supports to be removed and replaced in a cost-effective and reliable manner.

Exemplary embodiments of shroud support replacement and repair are described above in detail. The methods are not limited to the specific embodiments described herein, but rather, aspects of each method may be utilized independently and separately from other methods described herein.

While the invention has been described in terms of various specific embodiments, those skilled in the art will recognize that the invention can be practiced with modification within the spirit and scope of the claims.

What is claimed is:

1. A method for replacing a portion of a gas turbine engine turbine support, wherein the turbine support includes a body including a forward leg, an aft leg, and a mounting flange that each extend radially outwardly from the body, the forward leg axially upstream from the aft leg and the mounting flange, the mounting flange substantially axially aligned with respect to the aft leg, said method comprising:

cutting through at least one of the body, the aft leg, and the mounting flange;

removing the forward leg and at least a portion of the body that is upstream from the cut from the engine; and coupling a replacement spad to the portion of the turbine support that is downstream from the cut.

2. A method in accordance with claim 1 wherein coupling a replacement spad further comprises coupling the replacement spad to the turbine support using electron beam welding.

3. A method in accordance with claim 1 wherein cutting through at least one of the body, the aft leg, and the mounting flange further comprises cutting radially through the body upstream from the aft leg and the mounting flange.

4. A method in accordance with claim 1 wherein cutting through at least one of the body, the aft leg, and the mounting flange further comprises cutting through the mounting flange radially outwardly from the aft leg, such that the aft leg is removable from the engine with the forward leg.

5. A method in accordance with claim 1 wherein coupling a replacement spad further comprises coupling a replacement spad to the turbine support that is fabricated from a different material than the remainder of the turbine support.

6. A method in accordance with claim 5 wherein coupling a replacement spad to the turbine support that is fabricated from a different material further comprises coupling a replacement spad to the turbine support that is fabricated from a bimetallic material.

7. A method in accordance with claim 1 further comprising coating the replacement spad with a metal coating.

8. A method for replacing a portion of a turbine support within a gas turbine engine, the turbine support fabricated from a first material and including a forward leg and an aft leg that extend radially inwardly from a body, and a mounting flange that extends radially outwardly from the body, said method comprising:

cutting through the turbine support;

removing the portion of the turbine support that is upstream from the cut such that the support forward leg and at least a portion of the support body are removed from the gas turbine engine; and coupling a replacement spad to the turbine support that is downstream from the cut, wherein the replacement spad is fabricated from a second material that is different than the support first material.

9. A method in accordance with claim 8 wherein coupling a replacement spad to the turbine support that is downstream from the cut comprises coupling the replacement spad to the turbine support using electron beam welding.

10. A method in accordance with claim 9 wherein coupling a replacement spad to the turbine support further comprises coupling a replacement spad that is fabricated from a bimetallic material to the portion of the turbine support that is downstream from the cut.

11. A method in accordance with claim 10 wherein cutting through the turbine support further comprises cutting through the support body upstream from the aft leg.

12. A method in accordance with claim 10 wherein cutting through the turbine support further comprises cutting through the mounting flange such that the support aft leg is removable from the turbine with the forward leg.

13. A method in accordance with claim 10 further comprising grit blasting the turbine support to facilitate removing contaminants from the turbine support.

14. A method in accordance with claim 10 further comprising heat treating the replacement spad after the spad is coupled to the portion of the turbine support that is aft of the cut.

15. A method for repairing a turbine support for a gas turbine engine, the turbine support including at least a forward mounting foot coupled to a body with a forward leg, and an aft mounting foot coupled to the body with an aft leg, said method comprising:

inspecting the turbine support for cracking;

repairing cracks detected with a welding process;

cutting through the turbine support such that a portion of the turbine support including at least one of the aft mounting foot and the forward mounting foot is removable from the turbine;

coupling a replacement spad to the remaining portion of the turbine support; and heat treating the turbine support after the replacement spad is coupled to the turbine support.

16. A method in accordance with claim 15 wherein coupling a replacement spad to the remaining portion of the turbine support further comprises using electron beam welding to couple the replacement spad to the turbine support.

17. A method in accordance with claim 16 wherein using electron beam welding to couple the replacement spad further comprises using electron beam welding to couple a replacement spad fabricated from a first material to the turbine support that is fabricated from a second material that is different than the first material.

18. A method in accordance with claim 16 wherein using electron beam welding to couple the replacement spad further comprises using electron beam welding to couple a replacement spad fabricated from a bimetallic material to the turbine support that is fabricated from a material that is different than the bimetallic material.

19. A method in accordance with claim 16 wherein using electron beam welding to couple the replacement spad further comprises using electron beam welding to couple a replacement spad to the turbine support such that the turbine support is returned to substantially the original predefined dimensional requirements of the turbine support.

20. A method in accordance with claim 16 wherein cutting through the turbine support further comprises cutting through the turbine support such that the forward mounting foot, the aft mounting foot, and at least a portion of the body are removable from the turbine.

* * * * *